United States Patent
Xu et al.

(10) Patent No.: US 9,456,393 B2
(45) Date of Patent: Sep. 27, 2016

(54) METHOD AND APPARATUS FOR NOTIFYING STARTING SYMBOL OF PHYSICAL DOWNLINK SHARED CHANNEL

(71) Applicant: FUJITSU LIMITED, Kawasaki-shi, Kanagawa (JP)

(72) Inventors: Haibo Xu, Beijing (CN); Yuantao Zhang, Beijing (CN); Yanling Lu, Beijing (CN); Weiwei Wang, Beijing (CN); Ningjuan Chang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/226,457

(22) Filed: Mar. 26, 2014

(65) Prior Publication Data
US 2014/0206362 A1 Jul. 24, 2014

Related U.S. Application Data

(63) Continuation of application No. PCT/CN2011/080509, filed on Sep. 30, 2011.

(51) Int. Cl.
*H04W 36/04* (2009.01)
*H04W 48/20* (2009.01)
*H04W 84/04* (2009.01)

(52) U.S. Cl.
CPC ............. *H04W 36/04* (2013.01); *H04W 48/20* (2013.01); *H04W 84/045* (2013.01)

(58) Field of Classification Search
CPC ........... H04W 72/042; H04W 84/045; H04W 72/04; H04W 72/1289; H04L 5/0053; H04L 5/0007; H04L 5/001; H04L 5/0094
See application file for complete search history.

(56) References Cited

U.S. PATENT DOCUMENTS

2010/0110901 A1* 5/2010 Wong et al. .................. 370/242
2010/0115358 A1* 5/2010 Kotecha et al. .............. 714/748
(Continued)

FOREIGN PATENT DOCUMENTS

| CN | 101854635 A | 10/2010 |
|----|-------------|---------|
| CN | 101860880 A | 10/2010 |
| CN | 102006642 A | 4/2011 |
| CN | 102026393 A | 4/2011 |
| CN | 201967138 U | 9/2011 |

OTHER PUBLICATIONS

International search report issued for international application No. PCT/CN2011/080509, mailed Jul. 5, 2012.
(Continued)

*Primary Examiner* — Vladimir Magloire
*Assistant Examiner* — Ernest Tacsik
(74) *Attorney, Agent, or Firm* — Myers Wolin, LLC.

(57) ABSTRACT

Embodiments of the present invention provide a method and apparatus for determining a starting symbol of a physical downlink shared channel; wherein, a Pico base station transmits information indicating a PDSCH starting symbol of the Pico base station to a Macro base station, the Macro base station transmits the information indicating a PDSCH starting symbol to a terminal, and the terminal determines the PDSCH starting symbol in accordance with the information indicating a PDSCH starting symbol. With the embodiments of the present invention, the terminal within a serving range of the Pico base station resulted from a high offset value will not incorrectly decode a PCFICH due to interference of the Macro base station, thereby making the terminal determine a demarcation symbol between a PDCCH and a PDSCH, further increasing the coverage of the Pico base station, and realizing load balancing of the Macro base station and Pico base station.

11 Claims, 9 Drawing Sheets

(56) References Cited

U.S. PATENT DOCUMENTS

2010/0238875 A1\*  9/2010  Sung et al. .................... 370/329
2010/0304748 A1\* 12/2010  Henttonen et al. ........... 455/436
2010/0322180 A1\* 12/2010  Kim et al. .................... 370/329
2011/0134774 A1\*  6/2011  Pelletier et al. .............. 370/252
2015/0092713 A1    4/2015  Pelletier et al.

OTHER PUBLICATIONS

First Office Action and search report issued by the State Intellectual Property Office of China for corresponding Chinese Patent Application No. 201180072068.5, mailed on Jul. 26, 2016, with an English translation.

\* cited by examiner

METHOD AND APPARATUS FOR NOTIFYING STARTING SYMBOL OF PHYSICAL DOWNLINK SHARED CHANNEL

CROSS-REFERENCE TO RELATED APPLICATIONS

This is a continuation of International Application No. PCT/CN2011/080509, filed on Sep. 30, 2011, now pending, the contents of which are herein wholly incorporated by reference.

TECHNICAL FIELD

The present invention relates to the field of communications, and in particular to a method and apparatus for notifying a starting symbol of a physical downlink shared channel.

BACKGROUND

In order to efficiently satisfy a communication capacity of a hot-spot area, lower a load of a Macro base station, improve spectrum efficiency and eliminate a dead serving zone of the Macro base station, a heterogeneous network schematic diagram of deployment of a Pico base station in a service intensive zone or edge zone in a serving range of a Macro base station in an LTE-advanced (LTE-A) system is shown in FIG. 1. Such a technology has been paid much attention, and has become an important technology in an LTE-A system.

A Pico base station is lower than a Macro base station with respect to transmission power, and its height of construction is relatively small, which may reduce power consumption and save the cost of construction. However, as a Pico base station is in the serving range of a Macro base station of high transmission power, it is relatively severely subjected to downlink interference of the Macro base station and hence, a downlink serving range of the Pico base station is much smaller than that of the Macro base station. In order to better realize load balancing between the Macro base station and the Pico base station and improve a capacity of the whole system, a technical scheme that expands the downlink serving range of the Pico base station has been proposed in the research of the standardization of the LTE-A, which is referred to as a cell range expansion (CRE) technology.

In the CRE technology, a Macro base station may select to hand over a user served by the Macro base station to a Pico base station by setting an offset value, so as to realize more load shunt. When the offset value is increased, the serving range of the Pico base station will be further expanded. However, an issue will be brought that interference of a Macro cell to a terminal within a serving range of a Pico cell resulted from the high offset value will further be increased, thereby making the terminal within the serving range of the Pico cell resulted from the high offset value unable to normally operate, which is because that when the terminal is located within the serving range of the Pico cell resulted from the high offset value and connected to the Pico base station, the interference from the Macro cell will make the terminal unable to correctly decode a physical control format indicator channel (PCFICH), thereby resulting in that the terminal is unable to determine a demarcation symbol between a physical downlink control channel (PDCCH) and a physical downlink shared channel (PDSCH).

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY

Embodiments of the present invention provide a method and apparatus for notifying a starting symbol of a physical downlink shared channel, so as to solve a problem of how to ensure that a terminal within a serving range of a Pico cell resulted from the high offset value is able to correctly obtain the number of OFDM symbols occupied by a downlink control channel of a Pico cell, or a starting symbol of a physical downlink shared channel in a Pico cell.

In order to achieve the above object, an embodiment of the present invention provides a method for notifying a starting symbol of a physical downlink shared channel in a Pico cell by a Macro base station to a terminal, the method including:

receiving, by the Macro base station, information indicating a PDSCH starting symbol of the Pico cell transmitted by a Pico base station; and transmitting, by the Macro base station, the information indicating a PDSCH starting symbol of the Pico cell to a terminal.

According to another aspect of the embodiments of the present invention, there is provided a method for notifying a starting symbol of a physical downlink shared channel by a Pico base station, the method including:

transmitting, by the Pico base station, information indicating a PDSCH starting symbol of a Pico cell to a Macro base station.

According to still another aspect of the embodiments of the present invention, there is provided a method for determining a starting symbol of a physical downlink shared channel by a terminal, the method including:

receiving, by the terminal, information indicating a PDSCH starting symbol of a Pico cell transmitted by a Macro base station; and obtaining, by the terminal, a PDSCH starting symbol in accordance with the information indicating a PDSCH starting symbol of the Pico cell.

According to further still another aspect of the embodiments of the present invention, there is provided a Macro base station notifying a terminal a starting symbol of a physical downlink shared channel in a Pico cell, including:

a receiving unit configured to receive information indicating a PDSCH starting symbol of the Pico cell transmitted by a Pico base station; and a transmitting unit configured to transmit the information indicating a PDSCH starting symbol of the Pico cell to a terminal.

According to further still another aspect of the embodiments of the present invention, there is provided a Pico base station notifying a starting symbol of a physical downlink shared channel, including:

a reporting unit configured to transmit information indicating a PDSCH starting symbol of a Pico cell to a Macro base station.

According to further still another aspect of the embodiments of the present invention, there is provided a terminal determining a starting symbol of a physical downlink shared channel, including:

a receiving unit configured to receive information indicating a PDSCH starting symbol of a Pico cell transmitted by a Macro base station; and an acquiring unit configured to acquire a PDSCH starting symbol from the information indicating a PDSCH starting symbol of the Pico cell.

According to further still another aspect of the embodiments of the present invention, there is provided a computer-readable program, wherein when the program is executed in a Macro base station or a Pico base station, the program enables a computer to carry out the method for notifying a physical downlink shared channel starting symbol by a Macro base station or a Pico base station as described above in the base station.

According to further still another aspect of the embodiments of the present invention, there is provided a storage medium storing a computer-readable program, wherein the computer-readable program enables a computer to carry out the method for notifying a physical downlink shared channel starting symbol by a Macro base station or a Pico base station as described above in a Macro base station or a Pico base station.

According to further still another aspect of the embodiments of the present invention, there is provided a computer-readable program, wherein when the program is executed in a terminal, the program enables a computer to carry out the method for determining a physical downlink shared channel starting symbol by a terminal as described above in the terminal.

According to further still another aspect of the embodiments of the present invention, there is provided a storage medium storing a computer-readable program, wherein the computer-readable program enables a computer to carry out the method for determining a physical downlink shared channel starting symbol by a terminal as described above in a terminal.

The advantage of the embodiments of the present invention resides in that the terminal within a serving range of the Pico base station resulted from a high offset value will not incorrectly decode a PCFICH due to interference of the Macro base station, thereby making the terminal determine a starting symbol of a PDCCH and a PDSCH, further increasing the coverage of the Pico base station, and realizing load balancing of the Macro base station and the Pico base station.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/comprises" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of this application, and are not intended to limit the present invention. In the drawings.

DETAILED DESCRIPTION

For more clarity of the object, technical solution and advantage of the present invention, particular embodiments of the present invention shall be described below in detail with reference to the drawings. The exemplary embodiments and their description are for the explanation of the present invention, and are not intended to limit the present invention.

Embodiment 1

Figure 1:
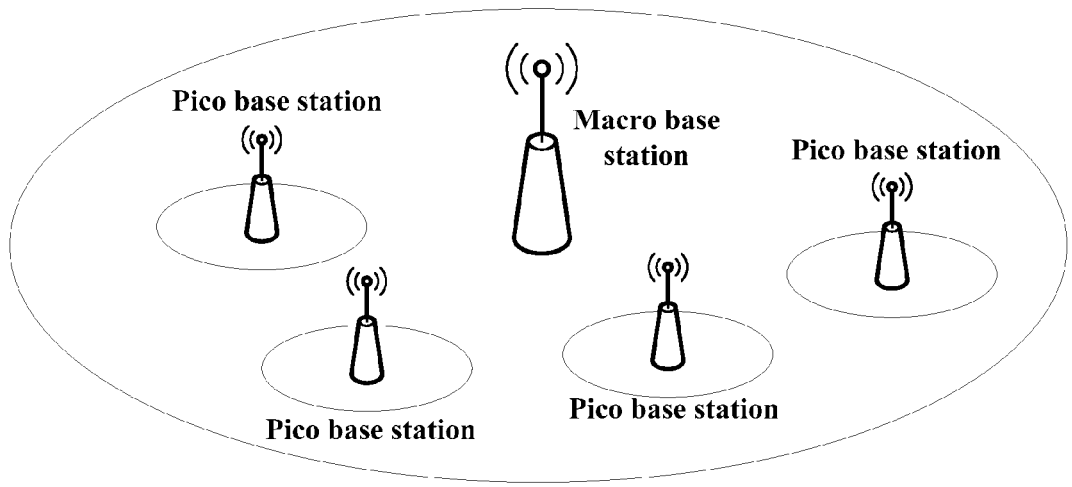
FIG. 1 shows a heterogeneous network schematic diagram of deployment of a Pico cell in a service intensive zone or edge zone in a serving range of a Macro base station in an LTE-A system.
Figure 2:
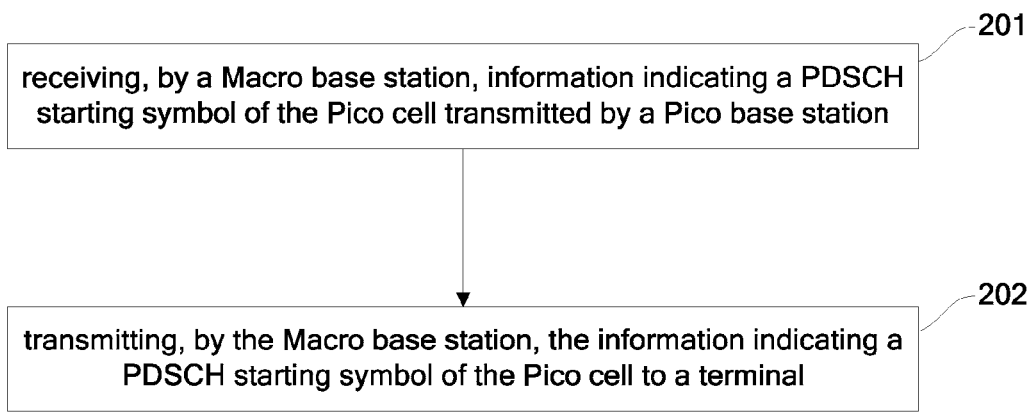
FIG. 2 shows a flowchart of the method for notifying a starting symbol of a physical downlink shared channel in a Pico cell by a Macro base station to a terminal of Embodiment 1 of the present invention.

FIG. 2 shows a flowchart of the method for notifying a starting symbol of a physical downlink shared channel in a Pico cell by a Macro base station to a terminal of Embodiment 1 of the present invention.

The method includes the steps of:

step 201: receiving, by the Macro base station, information indicating a PDSCH starting symbol of the Pico cell transmitted by a Pico base station; and step 202: transmitting, by the Macro base station, the information indicating a PDSCH starting symbol of the Pico cell to a terminal.

In the step 201, the Macro base station may receive the information indicating a PDSCH starting symbol via X2 interface signaling, such as Handover Acknowledgement and Load Information, transmitted by the Pico cell.

In the step 202, the Macro base station may transmit the information indicating a PDSCH starting symbol of the Pico cell to the terminal, for example, via RRCConnectionreconfiguration signaling including Mobility Control Information.

As an embodiment, the information indicating a PDSCH starting symbol of the Pico cell may include PDSCH starting information, the PDSCH starting information including a flag bit which indicates to configure or release the PDSCH starting information (1 or 0 may be taken, respectively indicative of configuring the PDSCH starting information or releasing the PDSCH starting information); if the flag bit indicates to configure the PDSCH starting information, the PDSCH starting information further includes valuation of 2 bits of the PDSCH starting symbol, that is, (1, 2, 3, spare), respectively indicating that a PDSCH in the Pico cell starts from the first, the second or the third OFDM symbol.

The information indicating a PDSCH starting symbol may include enhanced PDCCH (E-PDCCH) configuration information; wherein the E-PDCCH configuration information includes a flag bit which indicates to configure or release information of an E-PDCCH (1 or 0 may be taken, respectively indicative of configuring the E-PDCCH configuration information or releasing the E-PDCCH configuration information); if the flag bit indicates to configure the E-PDCCH, the E-PDCCH configuration information further includes a starting OFDM symbol and an ending OFDM symbol of the E-PDCCH, a downlink resource allocation mode of the E-PDCCH, a position of a physical resource block occupied by the E-PDCCH, and a flag bit indicating whether downlink control information (DCI) carried by the E-PDCCH includes the valuation of the PDSCH starting symbol (1 or 0 may be taken, respectively indicative of that the DCI carried by the E-PDCCH includes the valuation of the PDSCH starting symbol or the DCI carried by the E-PDCCH does not include the valuation of the PDSCH starting symbol).

The information indicating a PDSCH starting symbol includes enhanced PCFICH (E-PCFICH) configuration information; wherein the E-PCFICH configuration information includes a flag bit indicating whether the terminal needs to decode an E-PCFICH (1 or 0 may be taken, respectively indicative of needing to decode an E-PCFICH or not needing to decode an E-PCFICH).

The Macro base station may add the above information indicating a PDSCH starting symbol into Mobility Control Information or RadioResourceConfigCommon of the Mobility Control Information, or into PhysicalConfigDedicated of RadioResourceConfigDedicated, for transmission to the terminal.

With the above embodiment, the Macro base station may transmit the information indicating a PDSCH starting symbol of the Pico base station to which the terminal is be handed over to the terminal, thereby avoiding a problem that within a serving range of the Pico base station resulted from a high offset value, the terminal cannot determine a demarcation symbol between a PDCCH and a PDSCH due to interference from a Macro cell.

Embodiment 2

Figure 3:
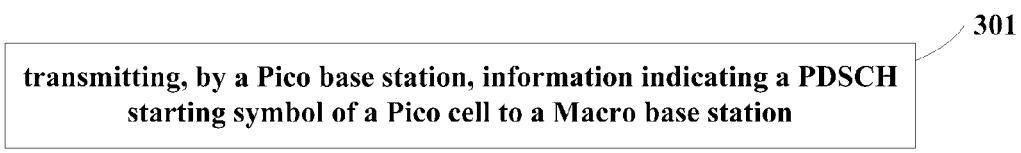
FIG. 3 shows a flowchart of the method for notifying a starting symbol of a physical downlink shared channel by a Pico base station of Embodiment 2 of the present invention.

FIG. 3 shows a flowchart of the method for notifying a starting symbol of a physical downlink shared channel by a Pico base station of an embodiment of the present invention.

The method includes a step of:

step 301: transmitting, by the Pico base station, information indicating a PDSCH starting symbol of a Pico cell to a Macro base station.

In the step 301, the Pico base station transmits the information indicating a PDSCH starting symbol of the Pico cell to the Macro base station via X2 interface signaling, such as Handover Acknowledgement or Load Information.

The information indicating a PDSCH starting symbol of a Pico cell is identical to that of Embodiment 1, which shall not be described herein any further.

As a further embodiment, the Pico base station transmits the information indicating a PDSCH starting symbol of the Pico cell to the terminal.

The Pico base station transmits valuation of the PDSCH starting symbol to the terminal via a master information block (MIB) of an RRC layer;

or, the Pico base station transmits valuation of the PDSCH starting symbol to the terminal via a second system information block (SIB2) of the RRC layer; for example, the valuation of the PDSCH starting symbol may be added into a RadioResourceConfigCommonSIB for notifying to the terminal;

or, the Pico base station transmits the PDSCH starting information to the terminal via RRCConnectionreconfiguration signaling of the RRC layer excluding Mobility Control Information; for example, the PDSCH starting information may be added into PhysicalConfigDedicated of RadioResourceConfigDedicated for notifying to the terminal;

or, the Pico base station transmits the E-PDCCH configuration information to the terminal via RRCConnectionreconfiguration signaling of the RRC layer excluding Mobility Control Information; for example, the E-PDCCH configuration information may be added into PhysicalConfigDedicated of RadioResourceConfigDedicated for notifying to the terminal, and the valuation of the PDSCH starting symbol may be added into DCI transmitted in the E-PDCCH for transmission to the terminal;

or, the Pico base station transmits the E-PCFICH configuration information to the terminal via RRCConnectionreconfiguration signaling of the RRC layer excluding Mobility Control Information; for example, the E-PCFICH configuration information may be added into PhysicalConfigDedicated of RadioResourceConfigDedicated for notifying to the terminal, and the valuation of the PDSCH starting symbol may be transmitted to the terminal via the E-PCFICH.

The Pico base station may further notify the terminal to restore decoding a PCFICH; that is, the terminal may correctly decode a PCFICH when the terminal enters into the Pico cell resulted from a low offset value, so as to determine the PDSCH starting symbol; and the Pico base station may notify the terminal to restore decoding the PCFICH by modifying the flag bit which indicates to configure or release the PDSCH starting information;

or, the Pico base station may notify the terminal to restore decoding the PCFICH by modifying the flag bit which indicates to configure or release E-PDCCH information;

or, the Pico base station may notify the terminal to restore decoding the PCFICH by modifying the flag bit that indicates whether the terminal needs to decode an E-PCFICH.

With the above embodiment, the Pico base station may report the information indicating a PDSCH starting symbol of a Pico cell to the Macro base station, so that the Macro base station notifies the information to the terminal. In this way, the problem that the terminal cannot correctly decode a PCFICH may be prevented, and the Pico base station may notify a change of the PDSCH starting symbol to the terminal in a real-time manner.

Embodiment 3

Figure 4:
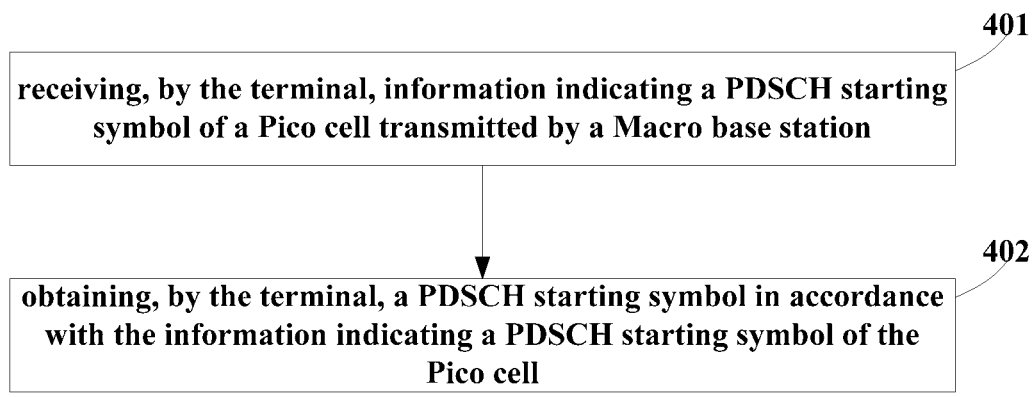
FIG. 4 shows a flowchart of the method for determining a starting symbol of a physical downlink shared channel by a terminal of Embodiment 3 of the present invention.

FIG. 4 shows a flowchart of the method for determining a starting symbol of a physical downlink shared channel by a terminal of an embodiment of the present invention.

The method includes the steps of:

step 401: receiving, by the terminal, information indicating a PDSCH starting symbol of a Pico cell transmitted by a Macro base station; and step 402: obtaining, by the terminal, a PDSCH starting symbol in accordance with the information indicating a PDSCH starting symbol of the Pico cell;

wherein, the information indicating a PDSCH starting symbol of a Pico cell is identical to that of Embodiment 1, which shall not be described herein any further.

In the step 401, the terminal may receive the PDSCH starting information from RRCConnectionreconfiguration signaling including Mobility Control Information transmitted by the Macro base station, and determine whether it is configured with PDSCH starting information by the Pico cell in accordance with a flat bit which indicates to configure or release PDSCH starting information in the PDSCH starting information; if the flat bit in the PDSCH starting information indicates to configure PDSCH starting information, the information indicating a PDSCH starting symbol in the Pico cell may be determined in step 402 according to evaluation of 2 bits of PDSCH starting symbol;

or, the terminal receives the E-PDCCH configuration information from RRCConnectionreconfiguration signaling including Mobility Control Information transmitted by the Macro base station, and determines whether it is configured with an E-PDCCH by the Pico cell in accordance with a flat bit which indicates to configure or release E-PDCCH in the E-PDCCH configuration information; if it is configured with an E-PDCCH by the Pico cell, an E-PDCCH in the Pico cell is decoded in accordance with starting and ending OFDM symbols of the E-PDCCH, a downlink resource allocation mode of the E-PDCCH, a position of a physical resource block occupied by the E-PDCCH, and a flag bit indicating whether DCI carried by the E-PDCCH includes the valuation of 2 bits of PDSCH starting symbol, indicated in the E-PDCCH configuration information, and the PDSCH starting symbol of the Pico cell is determined according to valuation of the PDSCH starting symbol in DCI obtained by decoding;

or, the terminal receives the E-PCFICH configuration information from RRCConnectionreconfiguration signaling including Mobility Control Information transmitted by the Macro base station, and determines whether to decode an E-PCFICH in the Pico cell in accordance with the E-PCFICH configuration information; if the E-PCFICH configuration information indicates that an E-PCFICH in the Pico cell needs to be decoded, the terminal decodes the E-PCFICH in the Pico cell, so as to determine the PDSCH starting symbol in the Pico cell.

After the step 401, the method may further include: receiving, by the terminal, information indicating PDSCH starting symbol of the Pico cell transmitted by a Pico base station; for example, the terminal receives valuation of the PDSCH starting symbol from MIB information broadcasted by the Pico base station, and determines the PDSCH starting symbol of the Pico cell in accordance with the valuation of the PDSCH starting symbol; if the terminal can correctly decode the PCFICH, the terminal determines the PDSCH starting symbol of the Pico cell in accordance with the PCFICH obtained by decoding, and receives the PDSCH starting information from the MIB information broadcasted by the Pico base station no longer;

or, the terminal receives valuation of the PDSCH starting symbol from SIB2 information broadcasted by the Pico base station, and determines the PDSCH starting symbol of the Pico cell in accordance with the valuation of the PDSCH starting symbol; if the terminal can correctly decode the PCFICH, the terminal determines the PDSCH starting symbol of the Pico cell in accordance with the PCFICH obtained by decoding, and receives the PDSCH starting information from the SIB2 information broadcasted by the Pico base station no longer;

or, the terminal receives the PDSCH starting information from RRCConnectionreconfiguration signaling excluding Mobility Control Information transmitted by the Pico base station, and judges whether PDSCH starting information is configured according to a flag bit which indicates to configure or release PDSCH starting information; if PDSCH starting information is configured, it determines the PDSCH starting symbol of the Pico cell in accordance with the valuation of the PDSCH starting symbol; and if the PDSCH starting information is released, it decodes the PCFICH to determine the PDSCH starting symbol of the Pico cell, and receives the PDSCH starting information from the RRCConnectionreconfiguration signaling excluding Mobility Control Information transmitted by the Pico base station no longer;

or, the terminal receives the E-PDCCH configuration information from RRCConnectionreconfiguration signaling excluding Mobility Control Information transmitted by the Pico base station, and determines whether it is configured with an E-PDCCH by the Pico cell in accordance with the E-PDCCH configuration information; if it is configured with an E-PDCCH by the Pico cell, an E-PDCCH in the Pico cell is decoded in accordance with starting and ending OFDM symbols of the E-PDCCH, a downlink resource allocation mode of the E-PDCCH, a position of a physical resource block occupied by the E-PDCCH, and a flag bit indicating whether DCI carried by the E-PDCCH includes the valuation of 2 bits of PDSCH starting symbol, indicated in the E-PDCCH configuration information, and the PDSCH starting symbol of the Pico cell is determined according to valuation of the PDSCH starting symbol in DCI obtained by decoding; and if the Pico base station releases its E-PDCCH configuration information, the terminal decodes the PCFICH to determine the PDSCH starting symbol of the Pico cell;

or, the terminal receives the E-PCFICH configuration information from RRCConnectionreconfiguration signaling excluding Mobility Control Information transmitted by the Pico base station, and determines whether it needs to decode an E-PCFICH in the Pico cell in accordance with the E-PCFICH configuration information; if the E-PCFICH configuration information indicates that it needs to decode an E-PCFICH in the Pico cell, the terminal decodes the E-PCFICH in the Pico cell to determine the PDSCH starting symbol of the Pico cell; and if the E-PCFICH configuration information indicates that it needs not to decode an E-PCFICH in the Pico cell, the terminal decodes the PCFICH to determine the PDSCH starting symbol of the Pico cell, and receives the E-PCFICH configuration information from the RRCConnectionreconfiguration signaling excluding Mobility Control Information transmitted by the Pico base station no longer.

With the above embodiment, the problem that the terminal cannot determine a PDSCH starting symbol due to interference of a Macro base station to a PCFICH may be prevented, and if a change of the PDSCH starting symbol in the Pico cell occurs, PDSCH starting information transmitted by the Pico base station may be received in a real-time manner, thereby determining the PDSCH starting symbol.

Embodiment 4

Figure 5:
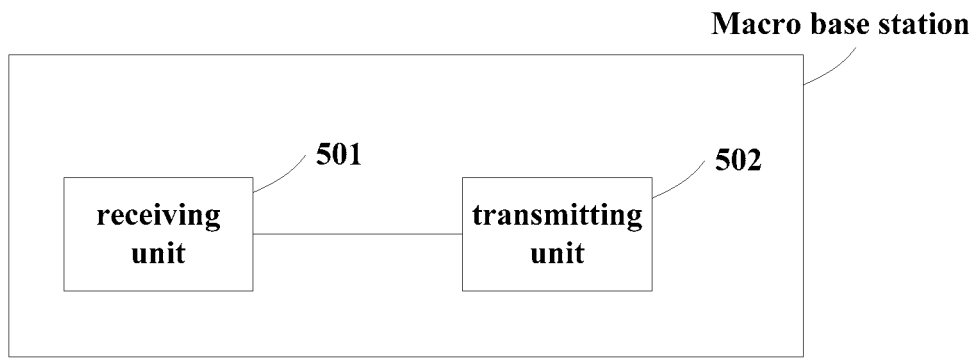
FIG. 5 shows a schematic diagram of the structure of a Macro base station notifying a starting symbol of a physical downlink shared channel in a Pico cell to a terminal of Embodiment 4 of the present invention.

FIG. 5 shows a schematic diagram of the structure of a Macro base station notifying a starting symbol of a physical downlink shared channel in a Pico cell to a terminal of an embodiment of the present invention.

The Macro base station includes:

a receiving unit 501 configured to receive information indicating a PDSCH starting symbol of the Pico cell transmitted by a Pico base station; and a transmitting unit 502 configured to transmit the information indicating a PDSCH starting symbol of the Pico cell to a terminal.

The receiving unit 501 receives the information indicating a PDSCH starting symbol of the Pico cell via X2 interface signaling, such as Handover Acknowledgement or Load Information.

The transmitting unit 502 may transmit the information indicating a PDSCH starting symbol of the Pico cell to the terminal via RRCConnection-reconfiguration signaling including Mobility Control Information.

The information indicating a PDSCH starting symbol of the Pico cell received from the Pico cell and transmitted to the terminal may be identical to that of Embodiment 1, which shall not be described herein any further.

Embodiment 5

Figure 6:
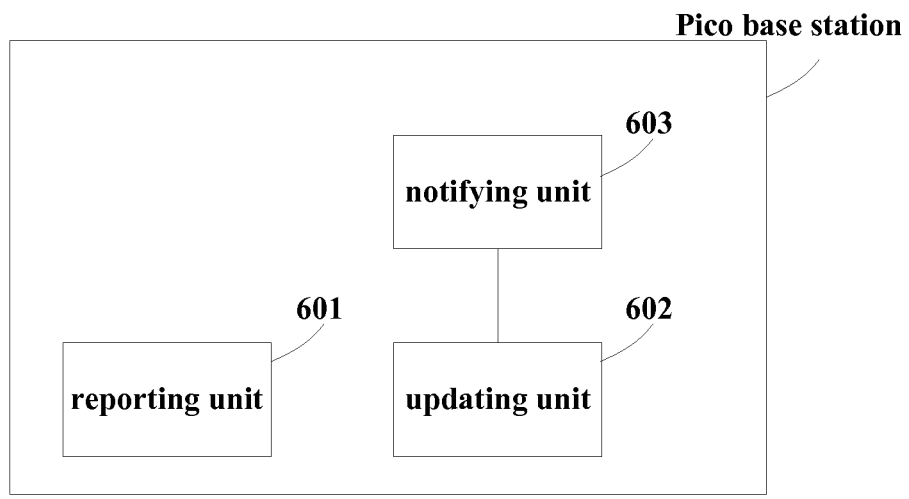
FIG. 6 shows a schematic diagram of the structure of a Pico base station notifying a starting symbol of a physical downlink shared channel of Embodiment 5 of the present invention.

FIG. 6 shows a schematic diagram of the structure of a Pico base station notifying a starting symbol of a physical downlink shared channel of an embodiment of the present invention.

The Pico base station includes:

a reporting unit 601 configured to transmit information indicating a PDSCH starting symbol of a Pico cell to a Macro base station.

The reporting unit 601 may transmit the information indicating a PDSCH starting symbol of a Pico cell to the Macro base station via X2 interface signaling, such as Handover Acknowledgement or Load Information.

The information indicating a PDSCH starting symbol of the Pico cell may be identical to that of Embodiment 1, which shall not be described herein any further.

The Pico base station may further include an updating unit 602 configured to transmit the information indicating a PDSCH starting symbol of the Pico cell to a terminal; wherein the updating unit 602 may transmit valuation of the PDSCH starting symbol to the terminal via a master information block (MIB) of an RRC layer;

or, the updating unit 602 transmits valuation of the PDSCH starting symbol to the terminal via a second system information block (SIB2) of the RRC layer;

or, the updating unit 602 transmits the PDSCH starting information to the terminal via RRCConnectionreconfiguration signaling of the RRC layer excluding Mobility Control Information;

or, the updating unit 602 transmits the E-PDCCH configuration information to the terminal via RRCConnection-reconfiguration signaling of the RRC layer excluding Mobility Control Information and adds valuation of the PDSCH starting symbol to DCI transmitted in E-PDCCH for transmission to the terminal;

or, the updating unit 602 transmits the E-PCFICH configuration information to the terminal via RRCConnection-reconfiguration signaling of the RRC layer excluding Mobility Control Information, and transmits valuation of the PDSCH starting symbol to the terminal via an E-PCFICH.

The Pico base station may further include a notifying unit 603 configured to notify the terminal to restore decoding a PCFICH; wherein, the notifying unit 603 notifies the terminal to restore decoding a PCFICH by modifying the flag bit which indicates to configure or release the PDSCH starting information;

or, the notifying unit 603 notifies the terminal to restore decoding a PCFICH by modifying the flag bit which indicates to configure or release E-PDCCH information;

or, the notifying unit 603 notifies the terminal to restore decoding a PCFICH by modifying the flag bit that indicates whether the terminal needs to decode an E-PCFICH.

Embodiment 6

Figure 7:
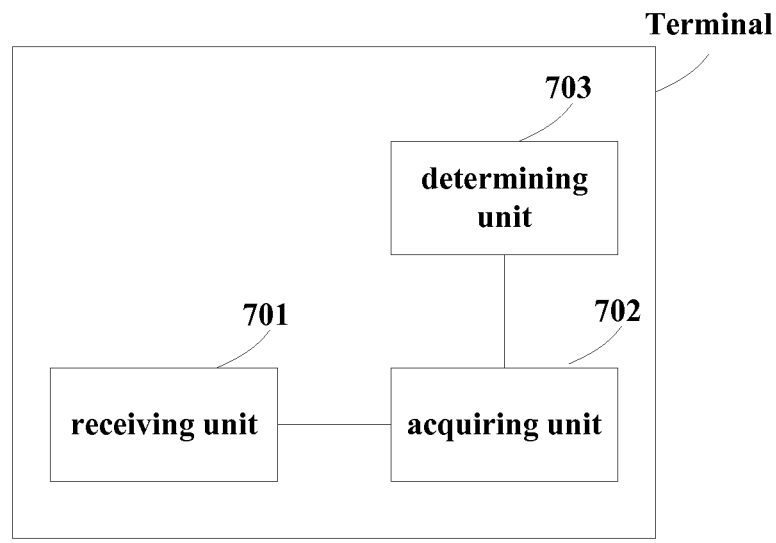
FIG. 7 shows a schematic diagram of the structure of a terminal determining a starting symbol of a physical downlink shared channel of Embodiment 6 of the present invention.

FIG. 7 shows a schematic diagram of the structure of a terminal determining a starting symbol of a physical downlink shared channel of an embodiment of the present invention.

The terminal includes:

a receiving unit 701 configured to receive information indicating a PDSCH starting symbol of a Pico cell transmitted by a Macro base station; and an acquiring unit 702 configured to acquire a PDSCH starting symbol from the information indicating a PDSCH starting symbol of the Pico cell.

The information indicating a PDSCH starting symbol of the Pico cell may be identical to that of Embodiment 1, which shall not be described herein any further.

The receiving unit 701 may receive the PDSCH starting information from RRCConnectionreconfiguration signaling including Mobility Control Information transmitted by the Macro base station, and the acquiring unit 702 may determine a PDSCH starting symbol of the Pico cell in accordance with evaluation of 2 bits of the PDSCH starting information;

or, the receiving unit 701 may further receive the E-PDCCH configuration information from RRCConnectionreconfiguration signaling including Mobility Control Information transmitted by the Macro base station, and the acquiring unit 702 may determine whether it is configured with an E-PDCCH by the Pico base station in accordance with a flag bit which indicates to configure or release an E-PDCCH in the E-PDCCH configuration information; if it is configured with an E-PDCCH by the Pico cell, an E-PDCCH in the Pico cell is decoded in accordance with starting and ending OFDM symbols of the E-PDCCH, a downlink resource allocation mode of the E-PDCCH, a position of a physical resource block occupied by the E-PDCCH, and a flag bit indicating whether DCI carried by the E-PDCCH includes the valuation of 2 bits of PDSCH starting symbol, indicated in the E-PDCCH configuration information, and the PDSCH starting symbol of the Pico cell is determined according to valuation of the PDSCH starting symbol in DCI obtained by decoding;

or, the receiving unit 701 may further receive the E-PCFICH configuration information from RRCConnectionreconfiguration signaling including Mobility Control Information transmitted by the Macro base station, and the acquiring unit 702 determines whether it needs to decode an E-PCFICH in the Pico cell in accordance with the E-PCFICH configuration information; if the E-PCFICH configuration information indicates that it needs to decode an E-PCFICH in the Pico cell, the acquiring unit 702 decodes the E-PCFICH in the Pico cell to determine the PDSCH starting symbol of the Pico cell.

The receiving unit 701 further receives information indicating PDSCH starting symbol of the Pico cell transmitted by a Pico base station. In which, The receiving unit 701 is further configured to receive valuation of the PDSCH starting symbol from MIB information broadcasted by the Pico base station, and the acquiring unit 702 is further configured to determine the PDSCH starting symbol of the Pico cell in accordance with the valuation of the PDSCH starting symbol; and the terminal may further include a determining unit 703 configured to judge that if a PCFICH can be correctly decoded, the acquiring unit 702 determines the PDSCH starting symbol of the Pico cell in accordance with the PCFICH obtained by decoding, and the PDSCH starting information is no longer received from the MIB information broadcasted by the Pico base station;

or, the receiving unit is further configured to receive valuation of the PDSCH starting symbol from SIB2 information broadcasted by the Pico base station, and the acquiring unit is further configured to determine the PDSCH starting symbol of the Pico cell in accordance with the valuation of the PDSCH starting symbol; and the terminal may further include a determining unit 703 configured to judge that if a PCFICH can be correctly decoded, the acquiring unit 702 determines the PDSCH starting symbol of the Pico cell in accordance with the PCFICH obtained by decoding, and the PDSCH starting information is no longer received from the SIB2 information broadcasted by the Pico base station;

or, the receiving unit 701 is further configured to receive the PDSCH starting information from RRCConnectionreconfiguration signaling excluding Mobility Control Information transmitted by the Pico base station, and the acquiring unit 702 is further configured to determine whether it is configured with PDSCH starting information in accordance with a flag bit which indicates to configure or release PDSCH starting information; if it is configured with PDSCH starting information, an PDSCH starting symbol in the Pico cell is determined in accordance with evaluation of the PDSCH starting symbol; and if the receiving unit 701 receives a notification transmitted by the Pico base station for releasing PDSCH starting information, the acquiring unit 702 decodes PCFICH to determine the PDSCH starting symbol in the Pico cell, and the PDSCH starting information is no longer received from the RRCConnectionreconfiguration signaling excluding Mobility Control Information transmitted by the Pico base station; as another embodiment, the terminal may further include a determining unit 703 configured to judge that if a PCFICH can be correctly decoded, the acquiring unit 702 determines the PDSCH starting symbol of the Pico cell in accordance with the PCFICH obtained by decoding;

or, the receiving unit 701 is further configured to receive the E-PDCCH configuration information from RRCConnectionreconfiguration signaling excluding Mobility Control Information transmitted by the Pico base station, and the acquiring unit 702 is further configured to determine whether it is configured with an E-PDCCH by the Pico base station in accordance with the E-PDCCH configuration information; if it is configured with an E-PDCCH by the Pico cell, an E-PDCCH in the Pico cell is decoded in accordance with starting and ending OFDM symbols of the E-PDCCH, a downlink resource allocation mode of the E-PDCCH, a position of a physical resource block occupied by the E-PDCCH, and a flag bit indicating whether DCI carried by the E-PDCCH includes the valuation of 2 bits of PDSCH starting symbol, indicated in the E-PDCCH configuration information, and the PDSCH starting symbol of the Pico cell is determined according to valuation of the PDSCH starting symbol in DCI obtained by decoding; if the receiving unit 701 receives a notification transmitted by the Pico base station for releasing E-PDCCH configuration information, the acquiring unit 702 stops decoding the E-PDCCH, restores decoding a PDCCH and decodes the PCFICH, so as to determine the PDSCH starting symbol of the Pico cell; as another embodiment, the terminal may further include a determining unit 703 configured to judge that if a PCFICH can be correctly decoded, the acquiring unit 702 determines the PDSCH starting symbol of the Pico cell in accordance with the PCFICH obtained by decoding;

or, the receiving unit 701 is further configured to receive the E-PCFICH configuration information from RRCConnectionreconfiguration signaling excluding Mobility Control Information transmitted by the Pico base station, and the acquiring unit 702 is further configured to determine whether an E-PCFICH in the Pico cell needs to be decoded according to the E-PCFICH configuration information; if the E-PCFICH configuration information indicates that an E-PCFICH in the Pico cell needs to be decoded, the acquiring unit 702 decodes the E-PCFICH in the Pico cell, so as to determine the PDSCH starting symbol of the Pico cell; and if the receiving unit 701 receives a notification transmitted by the Pico base station for releasing E-PCFICH H configuration information, that is, an E-PCFICH in the Pico cell needs not to be decoded, the acquiring unit 702 decodes the PCFICH to determine the PDSCH starting symbol, and the E-PCFICH configuration information is no longer received from the RRCConnectionreconfiguration signaling excluding Mobility Control Information transmitted by the Pico base station; as another embodiment, the terminal may further include a determining unit 703 configured to judge that if a PCFICH can be correctly decoded, the acquiring unit 702 determines the PDSCH starting symbol of the Pico cell in accordance with the PCFICH obtained by decoding.

Embodiment 7

Figure 8A:
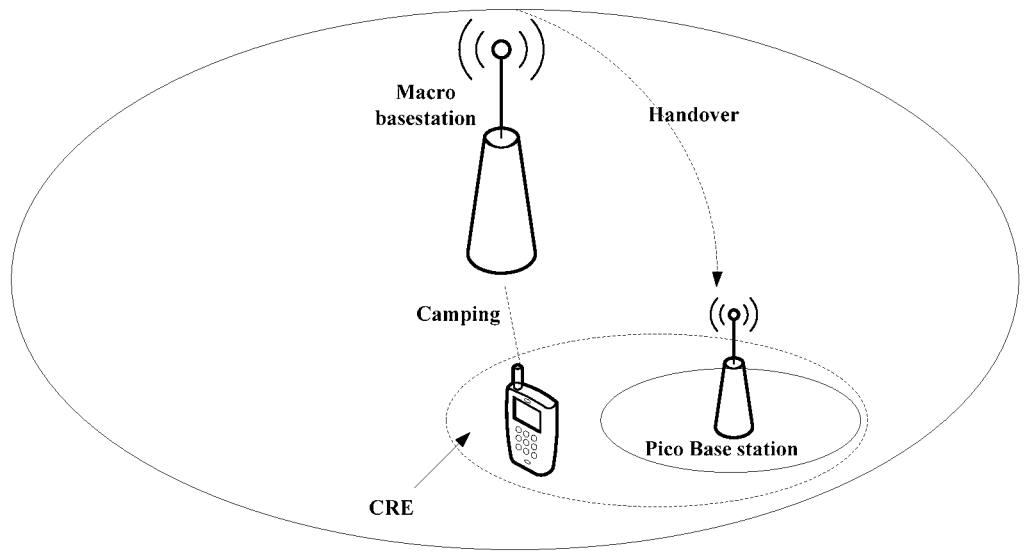
FIG. 8A shows a schematic diagram of scenario 1 to which an embodiment of the present invention is applicable.

FIG. 8a shows a schematic diagram of scenario 1 to which an embodiment of the present invention is applicable. An initial position of the terminal is within a serving area of the Pico base station resulted from a high offset value. When the terminal is in an RRC_Idle state, the terminal will select to stay in a serving area of the Macro base station, as the terminal does not support the offset value of the serving area of the Pico base station. After the terminal is transferred from the RRC_Idle state to an RRC_Connected state, the Macro base station will select to hand over the terminal to the serving area of the Pico base station, so as to realize load shunt.

Figure 8B:
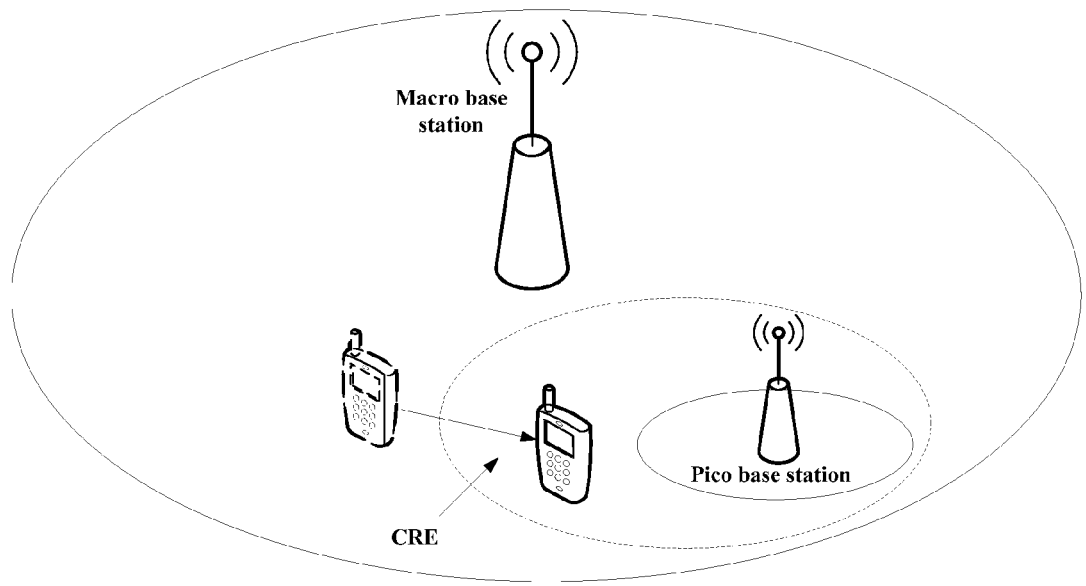
FIG. 8B shows a schematic diagram of scenario 2 to which an embodiment of the present invention is applicable.

FIG. 8b shows a schematic diagram of scenario 2 to which an embodiment of the present invention is applicable. An initial position of the terminal is only within a serving area of the Macro base station. After the terminal enters into a serving area of the Pico base station resulted from a high offset value, the Macro base station will select to hand over the terminal to the serving area of the Pico base station, so as to realize load shunt.

Figure 8C:
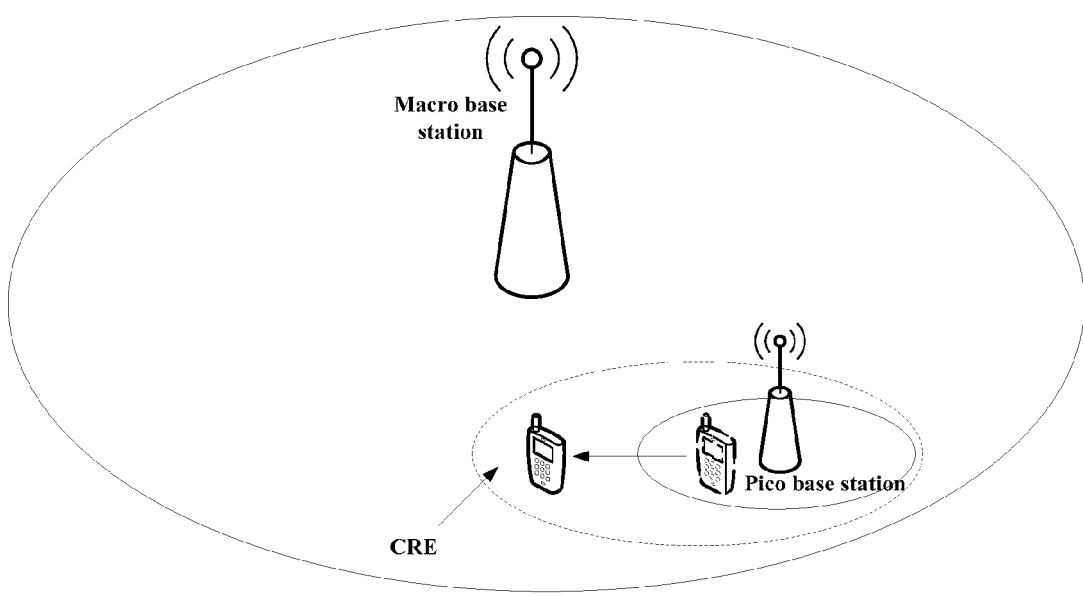
FIG. 8C shows a schematic diagram of scenario 3 to which an embodiment of the present invention is applicable.

FIG. 8c shows a schematic diagram of scenario 3 to which an embodiment of the present invention is applicable. An initial position of the terminal is within a serving area of the Pico base station resulted from a low offset value and the terminal is connected to the Pico base station. As the terminal will enter into a serving area of the Pico base station resulted from a high offset value and continues to be connected to the Pico base station, handover will not occur.

Figure 9:
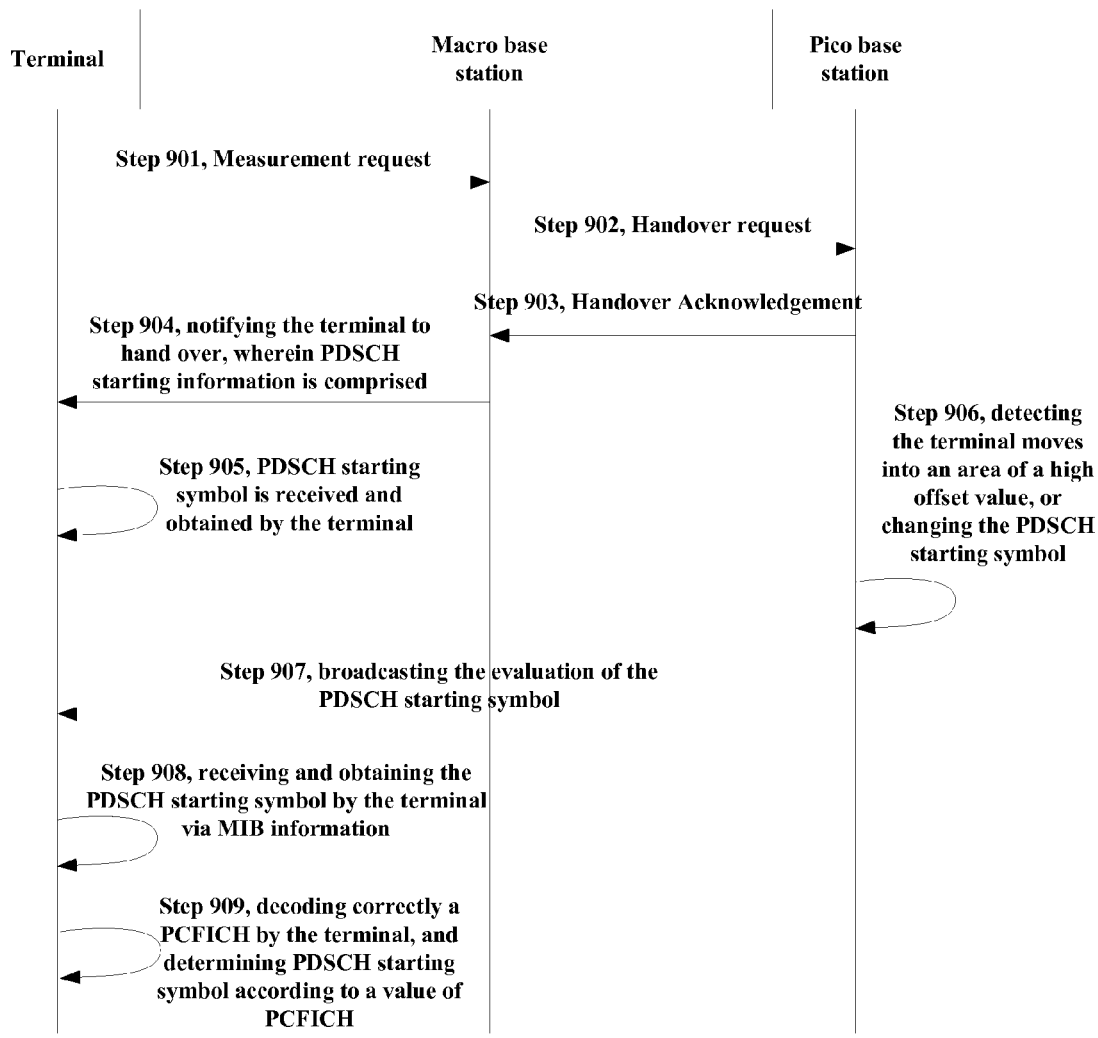
FIG. 9 shows a flowchart of the method for notifying a starting symbol of a physical downlink shared channel of Embodiment 7 of the present invention.

FIG. 9 shows a flowchart of the method for notifying a starting symbol of a physical downlink shared channel of an embodiment of the present invention.

The method includes the steps of:

step 901: with relationship between the terminal and the Pico base station and the Macro base station being the above scenario 1 or 2, initiating a measurement request by the terminal to the Macro base station. In this application, the terminal may include a mobile phone or other communication devices in an LTE-A network; and the high offset value may be for example greater than 10 dB, and at this moment, the Macro base station will affect decoding a PCFICH by the terminal, thereby resulting in that PDCCH and PDSCH starting symbols cannot be obtained by the terminal;

step 902: determining by the Macro base station to hand over the terminal to the serving area of the Pico base station resulted from the high offset value, and sending a handover request by the Macro base station to the Pico base station;

step 903: after receiving the request, if the handover request is accepted, and the load of the Pico base station permits for example, feeding back Handover Acknowledgement by the Pico base station to the Macro base station, the Handover Acknowledgement containing information indicating a PDSCH starting symbol of the Pico cell; wherein, the information indicating a PDSCH starting symbol contains PDSCH starting information, the PDSCH starting information including a flag bit which indicates to configure or release the PDSCH starting information (which is configured as 1 in this example, and 0 is indicative of releasing the PDSCH starting information); if the flag bit indicates to configure the PDSCH starting information, the PDSCH starting information further includes valuation of 2 bits of the PDSCH starting symbol, that is, (1, 2, 3, spare), respectively indicating that a PDSCH in the Pico base station starts from the first, the second or the third OFDM symbol;

step 904: notifying the terminal to hand over by the Macro base station via RRCConnectionreconfiguration signaling including Mobility Control Information after receiving the Handover Acknowledgement, and adding the PDSCH starting information into the RRCConnectionreconfiguration signaling; for example, adding the information into MobilityControlInfo, or into RadioResourceConfigCommon of the Mobility Control Information;

step 905: obtaining evaluation of 2 bits of PDSCH starting symbol in the PDSCH starting information by the terminal after receiving the information indicating a PDSCH starting symbol from the MobilityControlInfo, or from the RadioResourceConfigCommon of the Mobility Control Information, as the flag bit which indicates to configure or release the PDSCH starting information is 1, so as to obtain the PDSCH starting information; for example, when the evaluation of the PDSCH starting symbol is 1, a PDSCH in the Pico base station to which the terminal is handed over starts from the first OFDM symbol;

step 906: detecting by the Pico base station that the terminal moves into a serving range of the Pico base station resulted from a high offset value from a serving range of the Pico base station resulted from a low offset value according to reference signal received power (RSRP) and/or reference signal received quality (RSRQ) reported by the terminal, or changing the PDSCH starting information by the Pico base station according to a cell traffic amount;

step 907: notifying the information indicating a PDSCH starting symbol by the Pico base station to the terminal; in this example, the evaluation of 2 bits of the PDSCH starting symbol is added into an MIB for broadcasting to the terminal; in this example, the evaluation of the PDSCH starting symbol may be broadcasted via an SIB2, for example, the evaluation of 2 bits of the PDSCH starting symbol is added into RadioResourceConfigCommonSIB in an SIB; in step 908, the terminal may obtain the evaluation of the PDSCH starting symbol from RadioResourceConfigCommonSIB of the SIB2;

step 908: obtaining the evaluation of the PDSCH starting symbol by the terminal via MIB information, and determining the PDSCH starting symbol according to the evaluation of the PDSCH starting symbol; for example, if the evaluation of the PDSCH starting symbol is 1, a PDSCH in the Pico base station to which the terminal is handed over starts from the first OFDM symbol;

wherein, steps 906-908 may be carried out independent of steps 901-905, that is, they are applicable to scenario 3; and a technical problem of notifying a PDSCH starting symbol to a terminal in an area served by a Pico base station may be solved;

step 909: decoding correctly a PCFICH by the terminal after moving into an area served by the Pico base station resulted from a low offset value from an area served by the Pico base station resulted from a high offset value, and determining that from which of the OFDM symbols a PDSCH starts according to a value in the PCFICH, with the manners of steps 907-908 being used no longer for obtaining the PDSCH starting symbol.

Embodiment 8

Figure 10:
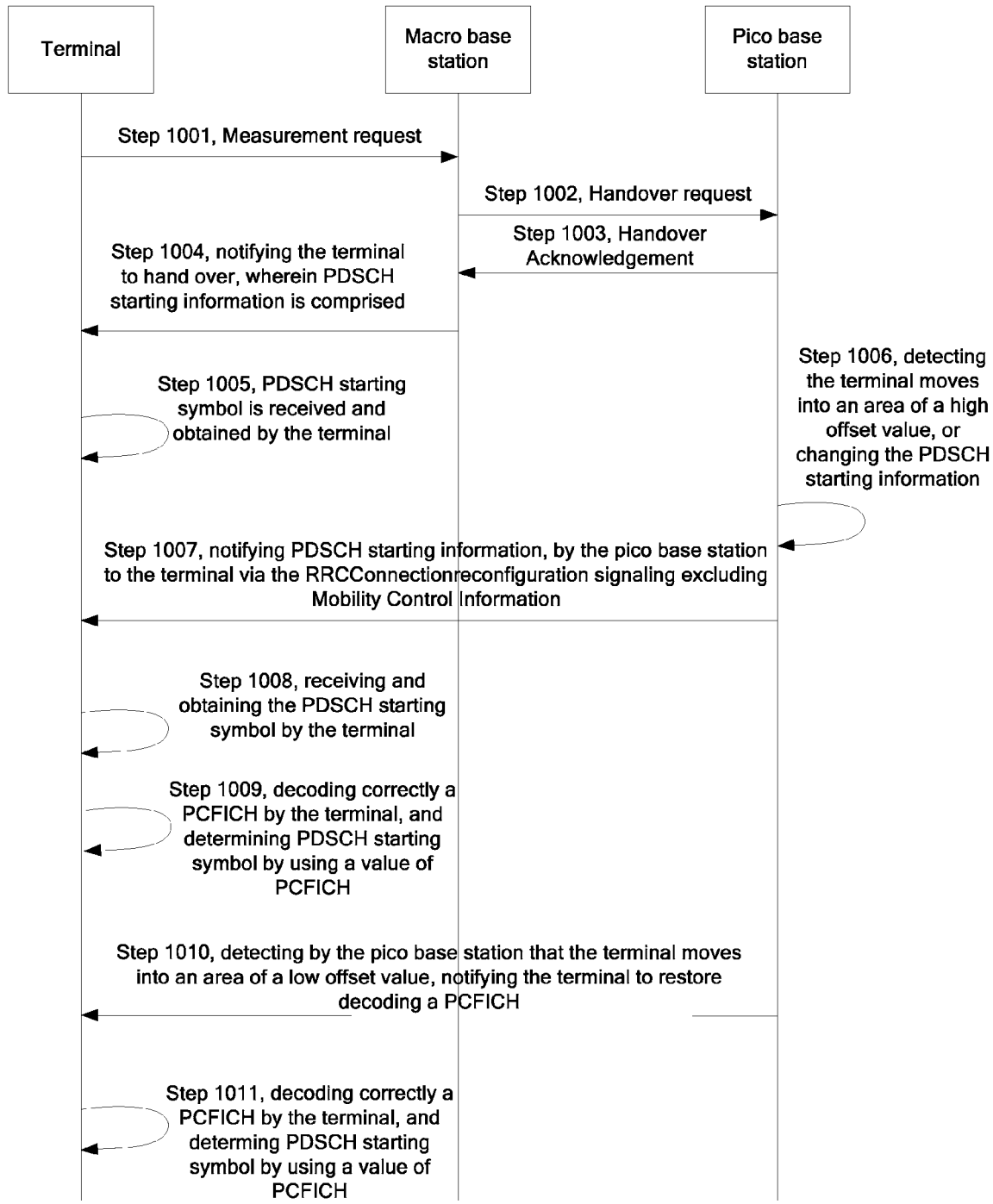
FIG. 10 shows a flowchart of the method for notifying a starting symbol of a physical downlink shared channel of Embodiment 8 of the present invention.

FIG. 10 shows a flowchart of the method for notifying a starting symbol of a physical downlink shared channel of an embodiment of the present invention.

The method includes the steps of:

step 1001: with relationship between the terminal and the Pico base station and the Macro base station being the above scenario 1 or 2, initiating a measurement request by the terminal to the Macro base station;

step 1002: determining by the Macro base station to hand over the terminal to the Pico base station having the serving area resulted from the high offset value, and sending a handover request by the Macro base station to the Pico base station;

step 1003: after receiving the request, if the handover request is accepted, and the load of the Pico base station permits for example, feeding back Handover Acknowledgement by the Pico base station to the Macro base station, the Handover Acknowledgement containing information indicating a PDSCH starting symbol of the Pico cell; wherein, the information indicating a PDSCH starting symbol contains PDSCH starting information, the PDSCH starting information, for example, including a flag bit which indicates to configure or release the PDSCH starting information and valuation of 2 bits of the PDSCH starting symbol;

step 1004: notifying the terminal to hand over by the Macro base station via RRCConnectionreconfiguration signaling including Mobility Control Information after receiving the Handover Acknowledgement, and adding the PDSCH starting information into the RRCConnectionreconfiguration signaling; for example, adding the information into MobilityControlInfo, or into PhysicalConfigDedicated of RadioResourceConfigDedicated;

step 1005: obtaining evaluation of 2 bits of PDSCH starting symbol in the PDSCH starting information by the terminal after receiving the PDSCH starting information from the MobilityControlInfo, or from the PhysicalConfigDedicated of RadioResourceConfigDedicated, as the flag bit which indicates to configure or release the PDSCH starting information is 1, so as to obtain the PDSCH starting symbol;

step 1006: detecting by the Pico base station that the terminal moves into a serving range of the Pico base station resulted from a high offset value from a serving range of the Pico base station resulted from a low offset value according to RSRP and/or RSRQ reported by the terminal, or changing the PDSCH starting symbol by the Pico base station according to a cell traffic amount;

step 1007: notifying the information indicating a PDSCH starting symbol containing, for example, the flag bit which indicates to configure or release the PDSCH starting information and the evaluation of 2 bits of the PDSCH starting symbol, by the Pico base station to the terminal via the RRCConnectionreconfiguration signaling excluding Mobility Control Information, for example, notifying the terminal in the PhysicalConfigDedicated of the RadioResourceConfigDedicated;

step 1008: receiving the PDSCH starting information by the terminal from the PhysicalConfigDedicated of the RadioResourceConfigDedicated, and obtaining the PDSCH starting symbol according to the evaluation of the 2 bits of PDSCH starting symbol in the PDSCH starting information;

wherein, steps 1006-1008 may be carried out independent of steps 1001-1005, that is, they are applicable to scenario 3; and a technical problem of notifying a PDSCH starting symbol to a terminal in an area served by a Pico base station may be solved;

step 1009: decoding correctly a PCFICH by the terminal after moving into an area served by the Pico base station resulted from a low offset value from an area served by the Pico base station resulted from a high offset value, and determining that from which of the OFDM symbols a PDSCH starts according to a value in the PCFICH, with the manners of steps 1007-1008 being used no longer for obtaining the PDSCH starting symbol;

as an optional embodiment, steps 1010 and 1011 may be used for replacing step 1009; in step 1010, after detecting by the Pico base station that the terminal moves into a serving range of the Pico base station resulted from a high offset value from a serving range of the Pico base station resulted from a low offset value according to RSRP and/or RSRQ reported by the terminal, the Pico base station may notify the terminal to restore decoding a PCFICH; for example, the Pico base station may modify the flag bit which indicates to configure or release the PDSCH starting information into releasing the PDSCH starting information;

step 1011: decoding a value of the PCFICH to determine by the terminal that from which of the OFDM symbols a PDSCH starts according to indication of the flag bit, with the manners of steps 1007-1008 being used no longer for obtaining the PDSCH starting symbol.

Embodiment 9

Figure 11:
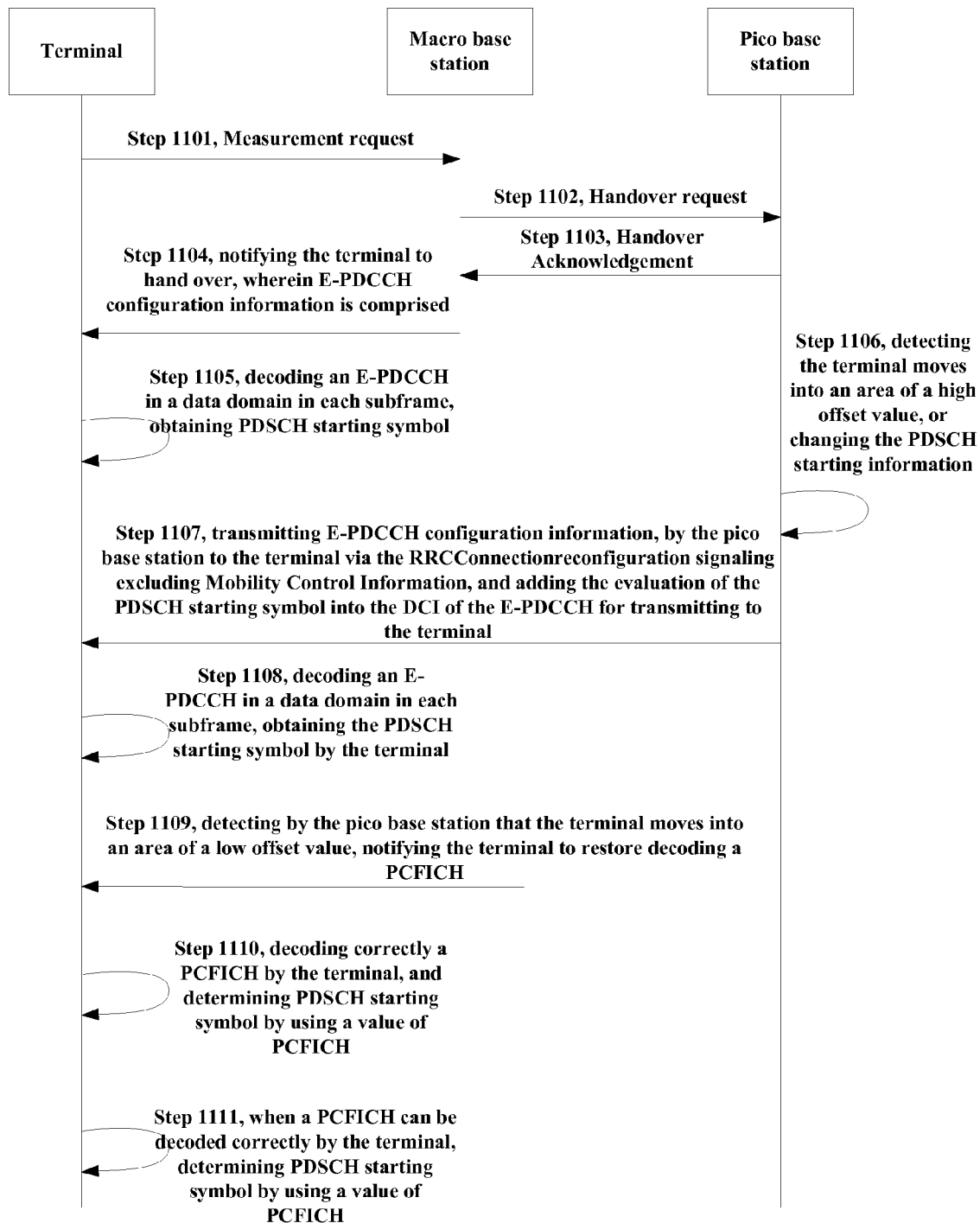
FIG. 11 shows a flowchart of the method for notifying a starting symbol of a physical downlink shared channel of Embodiment 9 of the present invention.

FIG. 11 shows a flowchart of the method for notifying a starting symbol of a physical downlink shared channel of an embodiment of the present invention.

The method includes the steps of:

step 1101: with relationship between the terminal and the Pico base station and the Macro base station being the above scenario 1 or 2, initiating a measurement request by the terminal to the Macro base station;

step 1102: determining by the Macro base station to hand over the terminal to the Pico base station having the serving area resulted from the high offset value, and sending a handover request by the Macro base station to the Pico base station;

step 1103: after receiving the request, if the handover request is accepted, and the load of the Pico base station permits for example, feeding back Handover Acknowledgement by the Pico base station to the Macro base station, the Handover Acknowledgement containing information indicating a PDSCH starting symbol of the Pico cell; wherein, the information indicating a PDSCH starting symbol contains E-PDCCH configuration information, the E-PDCCH configuration information including a flag bit which indicates to configure or release an E-PDCCH; if it indicates to configure an E-PDCCH, the E-PDCCH configuration information further includes a starting OFDM symbol and an ending OFDM symbol of the E-PDCCH, a downlink resource allocation mode of the E-PDCCH, a position of a physical resource block occupied by the E-PDCCH, and a flag bit indicating whether DCI carried by the E-PDCCH includes the valuation of the PDSCH starting symbol;

step 1104: notifying the terminal to hand over by the Macro base station via RRCConnectionreconfiguration signaling including Mobility Control Information after receiving the Handover Acknowledgement, and adding the E-PDCCH configuration information into the RRCConnectionreconfiguration signaling; for example, adding the information into MobilityControlInfo, or into PhysicalConfigDedicated of RadioResourceConfigDedicated;

step 1105: handing over the terminal to the Pico base station after the terminal receives the E-PDCCH configuration information from the MobilityControlInfo or from the PhysicalConfigDedicated of the RadioResourceConfigDedicated, and determining whether the terminal is configured with an E-PDCCH by the Pico base station according to the flag bit which indicates to configure or release an E-PDCCH; decoding an E-PDCCH in a data domain in each subframe in the Pico cell according to the starting OFDM symbol and ending OFDM symbol of the E-PDCCH, the downlink resource allocation mode of the E-PDCCH, the position of the physical resource block occupied by the E-PDCCH, and the flag bit indicating whether DCI carried by the E-PDCCH includes the valuation of the PDSCH starting symbol in the E-PDCCH configuration information if it is configured with an E-PDCCH by the Pico base station, and determining the PDSCH starting symbol of the Pico cell according to valuation of the PDSCH starting symbol in DCI obtained by decoding;

step 1106: detecting by the Pico base station that the terminal moves into a serving range of the Pico base station resulted from a high offset value from a serving range of the Pico base station resulted from a low offset value according to RSRP and/or RSRQ reported by the terminal, or changing the PDSCH starting symbol by the Pico base station according to a cell traffic amount;

step 1107: transmitting the E-PDCCH configuration information by the Pico base station to the terminal, and adding the evaluation of the PDSCH starting symbol into the DCI of the E-PDCCH for transmitting to the terminal;

step 1108: determining whether the terminal is configured with an E-PDCCH by the Pico base station according to the flag bit which indicates to configure or release an E-PDCCH; decoding an E-PDCCH in a data domain in each subframe in the Pico cell according to the starting OFDM symbol and ending OFDM symbol of the E-PDCCH, the downlink resource allocation mode of the E-PDCCH, the position of the physical resource block occupied by the E-PDCCH, and the flag bit indicating whether DCI carried by the E-PDCCH includes the valuation of the PDSCH starting symbol in the E-PDCCH configuration information if it is configured with an E-PDCCH by the Pico base station, and determining the PDSCH starting symbol of the Pico cell according to valuation of the PDSCH starting symbol in DCI obtained by decoding;

wherein, steps 1106-1108 may be carried out independent of steps 1101-1105, that is, they are applicable to scenario 3; and a technical problem of notifying a PDSCH starting symbol to a terminal in an area served by a Pico base station may be solved;

step 1109: notifying the terminal by the Pico station to restore decoding a PCFICH after detecting by the Pico base station that the terminal moves into a serving range of the Pico base station resulted from a low offset value from a serving range of the Pico base station resulted from a high offset value according to RSRP and/or RSRQ reported by the terminal; for example, the terminal may be notified via the RRCConnectionreconfiguration signaling excluding Mobility Control Information to release an E-PDCCH, which may be realized by for example, modifying the flag bit which indicates to configure or release an E-PDCCH; stopping decoding an E-PDCCH, and restoring decoding a conventional PCFICH;

step 1110: stopping decoding an E-PDCCH and restoring decoding a PCFICH by the terminal after receiving the notification of configuration and release, and determining that from which of the OFDM symbols a PDSCH starts according to a value obtained by decoding the PCFICH, with the manners of steps 1107-1108 being used no longer for obtaining the PDSCH starting symbol;

as an embodiment, step 1111 may be used for replacing steps 1109-1110; in step 1111, after moving into a serving range of the Pico base station resulted from a low offset value from a serving range of the Pico base station resulted from a high offset value, the terminal may correctly decode a PCFICH and determine that from which of the OFDM symbols a PDSCH starts according to a value obtained by decoding the PCFICH, with the manners of steps 1107-1108 being used no longer for obtaining the PDSCH starting symbol.

Embodiment 10

Figure 12:
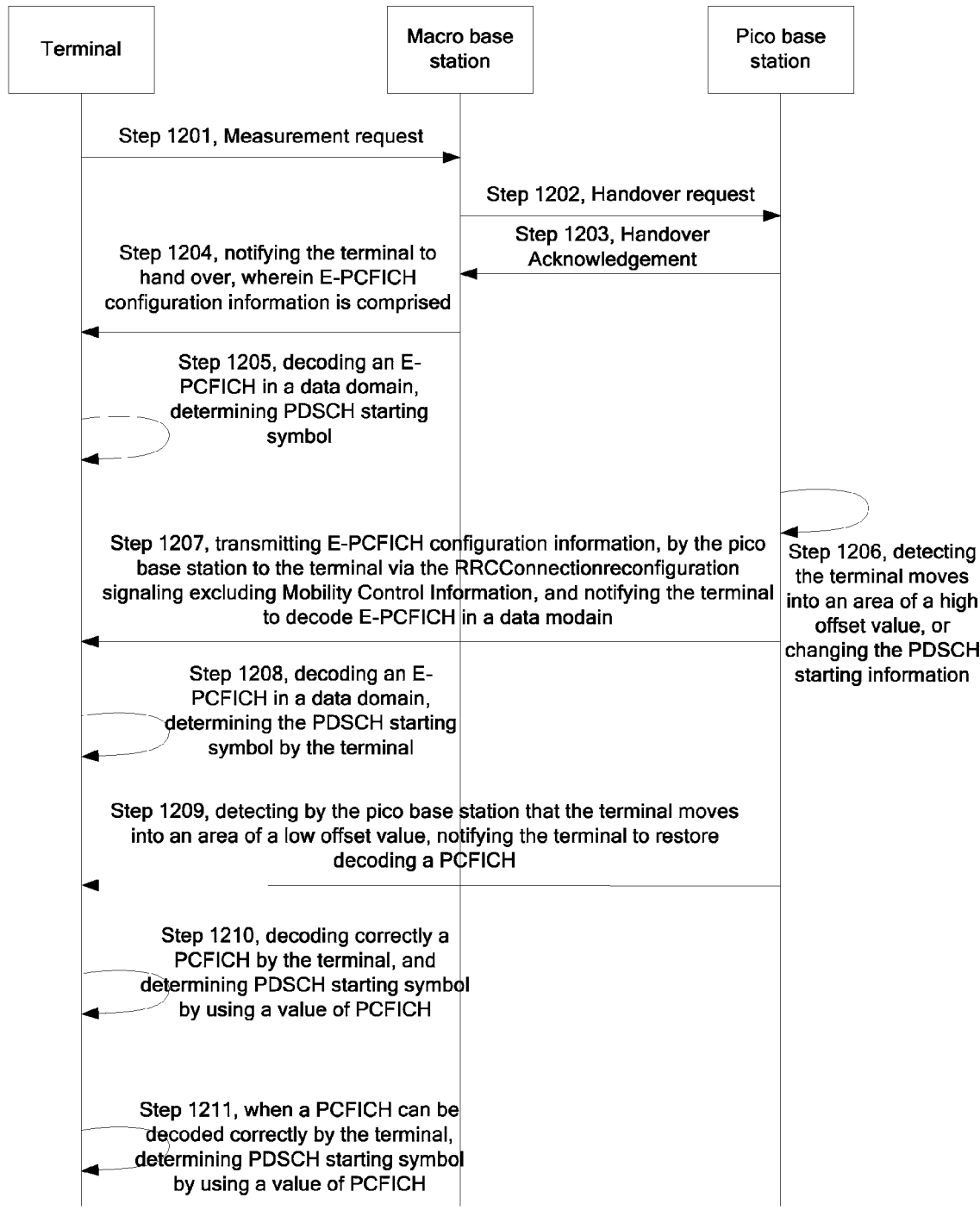
FIG. 12 shows a flowchart of the method for notifying a starting symbol of a physical downlink shared channel of Embodiment 10 of the present invention.

FIG. 12 shows a flowchart of the method for notifying a starting symbol of a physical downlink shared channel of an embodiment of the present invention.

Figure 13:
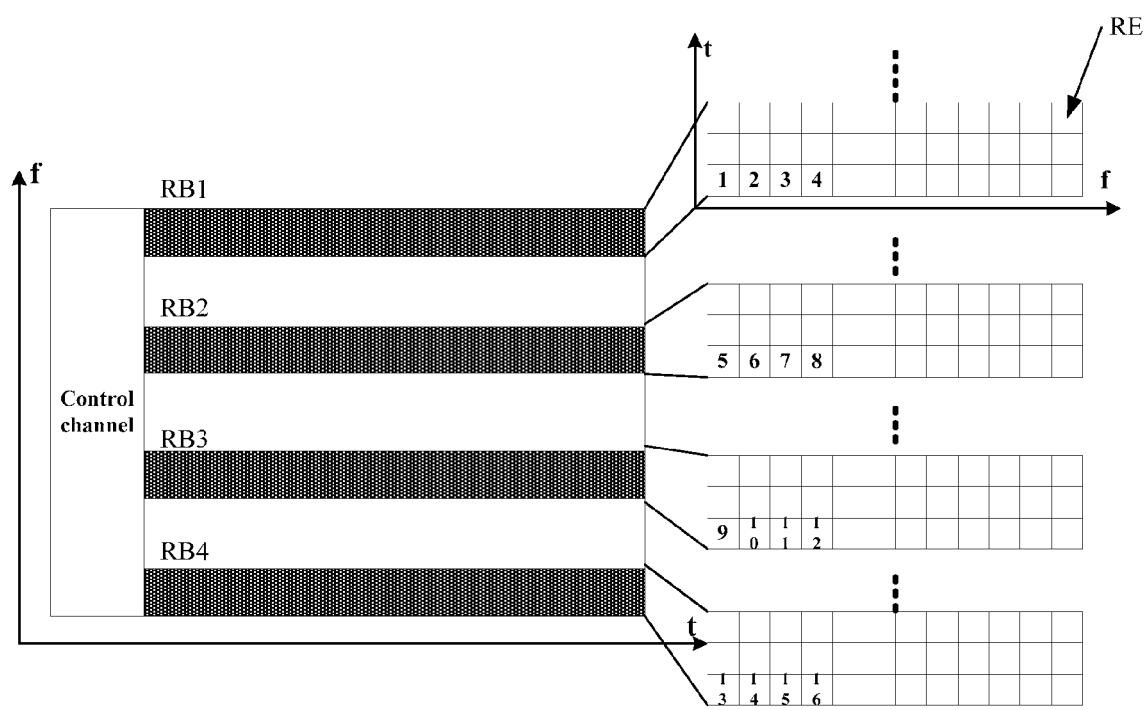
FIG. 13 shows a schematic diagram of the structure of an E-PCFICH of an embodiment of the present invention.

The method includes the steps of:

step 1201: with relationship between the terminal and the Pico base station and the Macro base station being the above scenario 1 or 2, initiating a measurement request by the terminal to the Macro base station;

step 1202: determining by the Macro base station to hand over the terminal to the Pico base station having the serving area resulted from the high offset value, and sending a handover request by the Macro base station to the Pico base station;

step 1203: after receiving the request, if the handover request is accepted, and the load of the Pico base station permits for example, feeding back Handover Acknowledgement by the Pico base station to the Macro base station, the Handover Acknowledgement containing information indicating a PDSCH starting symbol of the Pico cell; wherein, the information indicating a PDSCH starting symbol contains E-PDCCH configuration information, the E-PDCCH configuration information indicating whether an E-PCFICH in the Pico cell needs to be decoded;

step 1204: notifying the terminal to hand over by the Macro base station via RRCConnectionreconfiguration signaling including Mobility Control Information after receiving the Handover Acknowledgement, and adding the E-PCFICH configuration information into the RRCConnectionreconfiguration signaling; for example, adding the information into MobilityControlInfo, or into RadioResourceConfigCommon of the Mobility Control Information;

step 1205: after receiving the E-PCFICH configuration information from the MobilityControlInfo, or from the RadioResourceConfigCommon of the Mobility Control Information, receiving by the terminal a subframe transmitted by the Pico base station, decoding an E-PCFICH in a data domain in each subframe, and determining the PDSCH starting symbol in the Pico cell according to a result of decoding;

wherein, the OFDM symbol occupied by an E-PCFICH in each subframe is fixed; taking into consideration a system in which a downlink bandwidth value is greater than 10 RBs, a PDCCH occupies 3 OFDM symbols at most, and the E-PCFICH may be the fourth OFDM symbol of each subframe; in a system of in which a downlink bandwidth value is less than or equal to 10 RBs, a PDCCH occupies 4 OFDM symbols at most, and the E-PCFICH may be the fifth OFDM symbol of each subframe. FIG. 13 shows a schematic diagram of the structure of an E-PCFICH of an embodiment of the present invention, which is similar to a PCFICH, 2 bits information of an E-PCFICH is carried by 4 sequences, the length of each being 16 QPSK symbols; in order to obtain a frequency diversity gain as large as possible, the 16 QPSK symbols of the E-PCFICH are distributed in 16 REs in 4 discrete RBs;

step 1206: detecting by the Pico base station that the terminal moves into a serving range of the Pico base station resulted from a high offset value from a serving range of the Pico base station resulted from a low offset value according to RSRP and/or RSRQ reported by the terminal, or changing the PDSCH starting symbol by the Pico base station according to a cell traffic amount;

step 1207: transmitting the E-PCFICH configuration information by the Pico base station to the terminal via the RRCConnectionreconfiguration signaling excluding Mobility Control Information; for example, adding the E-PCFICH configuration information into the PhysicalConfigDedicated of the RadioResourceConfigDedicated, and transmitting the PDCCH starting information by the Pico base station to the terminal via the E-PCHICH;

step 1208: decoding an E-PCFICH in a data domain in each received subframe by the terminal after receiving that the E-PCFICH configuration information needs to be decoded, with a conventional PCFICH being decoded in a control domain no longer, and acquiring the PDSCH starting symbol according a PCFICH value in the E-PCFICH;

wherein, steps 1206-1208 may be carried out independent of steps 1201-1205, that is, they are applicable to scenario 3; and a technical problem of notifying a PDSCH starting symbol to a terminal in an area served by a Pico base station may be solved;

step 1209: notifying the terminal by the Pico station to restore decoding a PCFICH after detecting by the Pico base station that the terminal moves into a serving range of the Pico base station resulted from a low offset value from a serving range of the Pico base station resulted from a high offset value according to RSRP and/or RSRQ reported by the terminal; for example, the terminal may be notified via the RRCConnectionreconfiguration signaling to release, that is, stopping decoding an E-PCFICH, and restoring decoding a conventional PCFICH;

step 1210: stopping decoding an E-PCFICH and restoring decoding a PCFICH by the terminal after receiving the notification of configuration and release, and determining that from which of the OFDM symbols a PDSCH starts according to a value obtained by decoding the PCFICH, with the manners of steps 1207-1208 being used no longer for obtaining the PDSCH starting symbol;

as an embodiment, step 1211 may be used for replacing steps 1209-1210; in step 1211, after moving into a serving range of the Pico base station resulted from a low offset value from a serving range of the Pico base station resulted from a high offset value, the terminal may correctly decode a PCFICH and determine that from which of the OFDM symbols a PDSCH starts according to a value obtained by decoding the PCFICH, with the manners of steps 1207-1208 being used no longer for obtaining the PDSCH starting symbol.

Embodiment 11

An embodiment of the present invention further provides a computer-readable program, wherein when the program is executed in a Macro base station or a Pico base station, the program enables a computer to carry out the method for notifying a physical downlink shared channel starting symbol by a Macro base station or a Pico base station as described above in the base station.

An embodiment of the present invention further provides a storage medium storing a computer-readable program, wherein the computer-readable program enables a computer to carry out the method for notifying a physical downlink shared channel starting symbol by a Macro base station or a Pico base station as described above in a Macro base station or a Pico base station.

An embodiment of the present invention further provides a computer-readable program, wherein when the program is executed in a terminal, the program enables a computer to carry out the method for determining a physical downlink shared channel starting symbol by a terminal as described above in the terminal.

An embodiment of the present invention further provides a storage medium storing a computer-readable program, wherein the computer-readable program enables a computer to carry out the method for determining a physical downlink shared channel starting symbol by a terminal as described above in a terminal.

With the embodiments above, the terminal within a serving range of the Pico base station resulted from a high offset value will not incorrectly decode a PCFICH due to interference of the Macro base station, thereby making the terminal determine a starting symbol of a PDCCH and a PDSCH, further increasing the coverage of the Pico base station, and realizing load balancing of the Macro base station and the Pico base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A Macro base station notifying a terminal a starting symbol of a physical downlink shared channel in a Pico cell, comprising:
    a receiving unit configured to receive information indicating a physical downlink shared channel (PDSCH) starting symbol of the Pico cell transmitted by a Pico base station; and
    a transmitting unit configured to transmit the information indicating a PDSCH starting symbol of the Pico cell to a terminal; wherein
    the information indicating a PDSCH starting symbol of the Pico cell comprises PDSCH starting information, the PDSCH starting information comprising a flag bit which indicates to configure or release the PDSCH starting information;
    if the flag bit indicates to configure the PDSCH starting information, the PDSCH starting information further comprises valuation of the PDSCH starting symbol, indicating that from which of OFDM symbols a PDSCH in the Pico cell starts;
    or, the information indicating a PDSCH starting symbol of the Pico cell comprises enhanced-physical downlink control channel (PDCCH) configuration information, wherein the enhanced-PDCCH configuration information comprises a flag bit which indicates to configure or release information of an enhanced-PDCCH;
    if the flag bit indicates to configure the enhanced-PDCCH, the enhanced-PDCCH configuration information further comprises a starting OFDM symbol and an ending OFDM symbol of the enhanced-PDCCH, a downlink resource allocation mode of the enhanced-PDCCH, a position of a physical resource block occupied by the enhanced-PDCCH, and a flag bit indicating whether downlink control information (DCI) carried by enhanced-PDCCH comprises the valuation of the PDSCH starting symbol;

or, the information indicating a PDSCH starting symbol comprises enhanced-PDCCH configuration information, wherein the enhanced-physical control format indicator channel (PCFICH) configuration information comprises a flag bit indicating whether a terminal needs to decode an enhanced-PCFICH.

2. A Pico base station notifying a starting symbol of a physical downlink shared channel, comprising:
a reporting unit configured to transmit information indicating a PDSCH starting symbol of a Pico cell to a Macro base station;
an updating unit configured to transmit the information indicating a PDSCH starting symbol of the Pico cell to a terminal;
a notifying unit configured to notify the terminal to decode a PCFICH;
wherein the notifying unit notifies the terminal to decode a PCFICH by modifying a flag bit in the information indicating the PDSCH starting symbol, wherein the flag bit indicates to configure or release the PDSCH starting information;
or, the notifying unit notifies the terminal to decode a PCFICH by modifying the flag bit which indicates to configure or release enhanced-PDCCH information;
or, the notifying unit notifies the terminal to decode a PCFICH by modifying the flag bit that indicates whether the terminal needs to decode an enhanced-PCFICH.

3. The Pico base station according to claim 2, wherein the information indicating a PDSCH starting symbol of the Pico cell comprises PDSCH starting information, the PDSCH starting information comprising a flag bit which indicates to configure or release the PDSCH starting information; if the flag bit indicates to configure the PDSCH starting information, the PDSCH starting information further comprises valuation of the PDSCH starting symbol, indicating that from which of OFDM symbols a PDSCH in the Pico cell starts;
or, the information indicating a PDSCH starting symbol of the Pico cell comprises enhanced-PDCCH configuration information, wherein the enhanced-PDCCH configuration information comprises a flag bit which indicates to configure or release information of an enhanced-PDCCH; if the flag bit indicates to configure the enhanced-PDCCH, the enhanced-PDCCH configuration information further comprises a starting OFDM symbol and an ending OFDM symbol of the enhanced-PDCCH, a downlink resource allocation mode of the enhanced-PDCCH, a position of a physical resource block occupied by the enhanced-PDCCH, and a flag bit indicating whether downlink control information (DCI) carried by enhanced-PDCCH comprises the valuation of the PDSCH starting symbol;
or, the information indicating a PDSCH starting symbol comprises enhanced-PDCCH configuration information, wherein the enhanced-PCFICH configuration information comprises a flag bit indicating whether a terminal needs to decode an enhanced-PCFICH.

4. The Pico base station according to claim 2, wherein the updating unit transmits valuation of the PDSCH starting symbol to the terminal via a master information block (MIB) of an RRC layer;
or, the updating unit transmits valuation of the PDSCH starting symbol to the terminal via a second system information block (SIB2) of the RRC layer;
or, the updating unit transmits the PDSCH starting information to the terminal via RRCConnectionreconfiguration signaling of the RRC layer excluding Mobility Control Information;
or, the updating unit transmits the enhanced-PDCCH configuration information to the terminal via RRCConnectionreconfiguration signaling of the RRC layer excluding Mobility Control Information and adds valuation of the PDSCH starting symbol to downlink control information (DCI) transmitted in enhanced-PDCCH for transmission to the terminal;
or, the updating unit transmits the enhanced-PCFICH configuration information to the terminal via RRCConnectionreconfiguration signaling of the RRC layer excluding Mobility Control Information, and transmits valuation of the PDSCH starting symbol to the terminal via an enhanced-PCFICH.

5. A terminal determining a starting symbol of a physical downlink shared channel, comprising:
a receiving unit configured to receive information indicating a PDSCH starting symbol of a Pico cell transmitted by a Macro base station; and
an acquiring unit configured to acquire a PDSCH starting symbol from the information indicating a PDSCH starting symbol of the Pico cell;
wherein the receiving unit further receives information indicating PDSCH starting symbol of the Pico cell transmitted by a Pico base station;
wherein, if the receiving unit receives a notification transmitted by the Pico base station for decoding a PCFICH, the acquiring unit decodes the PCFICH and determines the PDSCH starting symbol of the Pico cell in accordance with the decoded PCFICH;
wherein the receiving unit receives a notification transmitted by the Pico base station for releasing PDSCH starting information, and the acquiring unit decodes the PCFICH and determines the PDSCH starting symbol of the Pico cell in accordance with the decoded PCFICH;
or, the receiving unit receives a notification transmitted by the Pico base station for releasing enhanced-PDCCH configuration information, and the acquiring unit decodes the PCFICH and determines the PDSCH starting symbol of the Pico cell in accordance with the decoded PCFICH;
or, the receiving unit receives a notification transmitted by the Pico base station for not needing to decode an enhanced-PCFICH in the Pico cell, and the acquiring unit decodes the PCFICH and determines the PDSCH starting symbol of the Pico cell in accordance with the decoded PCFICH.

6. The terminal according to claim 5, wherein the information indicating a PDSCH starting symbol of the Pico cell comprises PDSCH starting information, the PDSCH starting information comprising a flag bit which indicates to configure or release the PDSCH starting information; if the flag bit indicates to configure the PDSCH starting information, the PDSCH starting information further comprises valuation of the PDSCH starting symbol, indicating that from which of OFDM symbols a PDSCH in the Pico cell starts;
or, the information indicating a PDSCH starting symbol of the Pico cell comprises enhanced-PDCCH configuration information, wherein the enhanced-PDCCH configuration information comprises a flag bit which indicates to configure or release information of an enhanced-PDCCH; if the flag bit indicates to configure the enhanced-PDCCH, the enhanced-PDCCH configuration information further comprises a starting OFDM symbol and an ending OFDM symbol of the enhanced-PDCCH, a downlink resource allocation mode of the enhanced-PDCCH, a position of a physical resource block occupied by the enhanced-PDCCH, and a flag bit indicating whether downlink control information (DCI) carried by the enhanced-PDCCH comprises the valuation of the PDSCH starting symbol;

or, the information indicating a PDSCH starting symbol comprises enhanced-PCFICH configuration information; wherein the enhanced-PCFICH configuration information comprises a flag bit indicating whether a terminal needs to decode an enhanced-PCFICH.

7. The terminal according to claim 6, wherein the receiving unit receives the PDSCH starting information from RRCConnectionreconfiguration signaling including Mobility Control Information transmitted by the Macro base station, and the acquiring unit determines a PDSCH starting symbol of the Pico cell in accordance with the PDSCH starting information;

or, the receiving unit receives the enhanced-PDCCH configuration information from RRCConnectionreconfiguration signaling including Mobility Control Information transmitted by the Macro base station, and the acquiring unit decodes an enhanced-PDCCH of the Pico cell in accordance with the enhanced-PDCCH configuration information, and determines the PDSCH starting symbol of the Pico cell according to valuation of the PDSCH starting symbol in DCI obtained by decoding;

or, the receiving unit receives the enhanced-PCFICH configuration information from RRCConnectionreconfiguration signaling including Mobility Control Information transmitted by the Macro base station, and the acquiring unit decodes an enhanced-PCFICH in the Pico cell in accordance with the enhanced-PCFICH configuration information to determine the PDSCH starting symbol of the Pico cell.

8. The terminal according to claim 5, wherein the receiving unit further receives valuation of the PDSCH starting symbol from MIB information broadcasted by the Pico base station, and the acquiring unit determines the PDSCH starting symbol of the Pico cell in accordance with the valuation of the PDSCH starting symbol;

or, the receiving unit further receives valuation of the PDSCH starting symbol from SIB2 information broadcasted by the Pico base station, and the acquiring unit further determines the PDSCH starting symbol of the Pico cell in accordance with the valuation of the PDSCH starting symbol.

9. The terminal according to claim 5, wherein the receiving unit is further configured to receive the PDSCH starting information from RRCConnectionreconfiguration signaling excluding Mobility Control Information transmitted by the Pico base station, and the acquiring unit is further configured to determine the PDSCH starting symbol of the Pico cell in accordance with the PDSCH starting information;

or, the receiving unit is further configured to receive the enhanced-PDCCH configuration information from RRCConnectionreconfiguration signaling excluding Mobility Control Information transmitted by the Pico base station, and the acquiring unit is further configured to decode an enhanced-PDCCH in the Pico cell in accordance with the enhanced-PDCCH configuration information, and determine the PDSCH starting symbol of the Pico cell according to valuation of the PDSCH starting symbol in downlink control information (DCI) obtained by decoding;

or, the receiving unit is further configured to receive the enhanced-PCFICH configuration information from RRCConnectionreconfiguration signaling excluding Mobility Control Information transmitted by the Pico base station, and the acquiring unit is further configured to decode an enhanced-PCFICH in the Pico cell in accordance with the enhanced-PCFICH configuration information to determine the PDSCH starting symbol of the Pico cell.

10. The terminal according to claim 8, further comprising a determining unit configured to determine, if the terminal correctly decodes the PCFICH, the PDSCH starting symbol of the Pico cell in accordance with the decoded PCFICH.

11. The terminal according to claim 9, further comprising a determining unit configured to determine, if the terminal correctly decodes the PCFICH, the PDSCH starting symbol of the Pico cell in accordance with the decoded PCFICH.

* * * * *